US005886611A

United States Patent [19]

Schaller et al.

[11] Patent Number: 5,886,611

[45] Date of Patent: Mar. 23, 1999

[54] FUSE ASSEMBLY

[75] Inventors: Thomas Schaller, Wuppertal; Bernd Scholz, Leichlingen; Stefan Kriegesmann, Dortmund; Holger Alksnat, Gevelsberg; Jurgen Dinger, Remscheid, all of Germany

[73] Assignee: Delphi Automotive Systems Deutschland GmbH, Wuppertal, Germany

[21] Appl. No.: 86,051

[22] Filed: May 28, 1998

[30] Foreign Application Priority Data

Jun. 9, 1997 [GB] United Kingdom .................. 9711725

[51] Int. Cl.$^{6}$ ........................ H01H 85/022; H01H 85/20; H02G 3/08; H02B 1/26

[52] U.S. Cl. .......................... 337/189; 337/187; 337/188; 337/229; 361/642; 361/626

[58] Field of Search .................................... 337/158, 159, 337/161, 188, 189, 229, 256, 290; 361/104, 626, 642, 646

[56] References Cited

U.S. PATENT DOCUMENTS

| | | | |
|---|---|---|---|
| 4,837,456 | 6/1989 | Rose | 307/106 |
| 5,023,752 | 6/1991 | Detter et al. | 361/399 |
| 5,088,940 | 2/1992 | Saito | 439/621 |
| 5,438,310 | 8/1995 | Ikari | 337/208 |
| 5,643,693 | 7/1997 | Hill et al. | 429/121 |
| 5,645,448 | 7/1997 | Hill | 439/522 |
| 5,645,457 | 7/1997 | Hirayama et al. | 439/801 |

*Primary Examiner*—Leo P. Picard
*Assistant Examiner*—Anatoly Vertman
*Attorney, Agent, or Firm*—Cary W. Brooks

[57] ABSTRACT

A fuse assembly (10) for mounting on a battery of a motor vehicle comprising a housing (12) of electrically insulating material having a base plate (22); a starter motor cable terminal (18) mounted on the base plate; a number of cable harness terminals (20); a fuse strip (14) secured on the base plate and including a busbar (36), a contact portion (40) adjacent the starter motor cable terminal, contact portions (38) making an electrical connection with each cable harness terminal, and fusible links (42) connecting the contact portions with the busbar; and a battery terminal clamp (16) having a mounting portion (26) positioned inside the housing and making an electrical connection with the busbar of the fuse strip, and a clamp portion (28) positioned outside the housing for making an electrical connection with a terminal post of the battery. Provides a compact fuse assembly for a motor vehicle.

7 Claims, 1 Drawing Sheet

FUSE ASSEMBLY

TECHNICAL FIELD

The present invention relates to a fuse assembly for mounting on a battery of a motor vehicle.

BACKGROUND OF THE INVENTION

In present arrangements in a motor vehicle, the fuse links associated with the starter motor cable and the cable harnesses of the motor vehicle are positioned at various locations within the motor vehicle. This arrangement complicates installation in the motor vehicle, and requires electrical cables to run between the battery terminal clamp and the fuse links.

SUMMARY OF THE INVENTION

The object of the present invention is to overcome the above mentioned disadvantages.

A fuse assembly in accordance with the present invention for mounting on a battery of a motor vehicle comprises a housing of electrically insulating material having a base plate; a starter motor cable terminal mounted on the base plate; a number of cable harness terminals; a fuse strip secured on the base plate and including a busbar, a contact portion adjacent the starter motor cable terminal, contact portions making an electrical connection with each cable harness terminal, and fusible links connecting the contact portions with the busbar; and a battery terminal clamp having a mounting portion positioned inside the housing and making an electrical connection with the busbar of the fuse strip, and a clamp portion positioned outside the housing for making an electrical connection with a terminal post of the battery.

The present invention provide a compact fuse assembly for a motor vehicle which is easy to install, and provides a direct connection between the battery terminal clamp and the fuse links.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
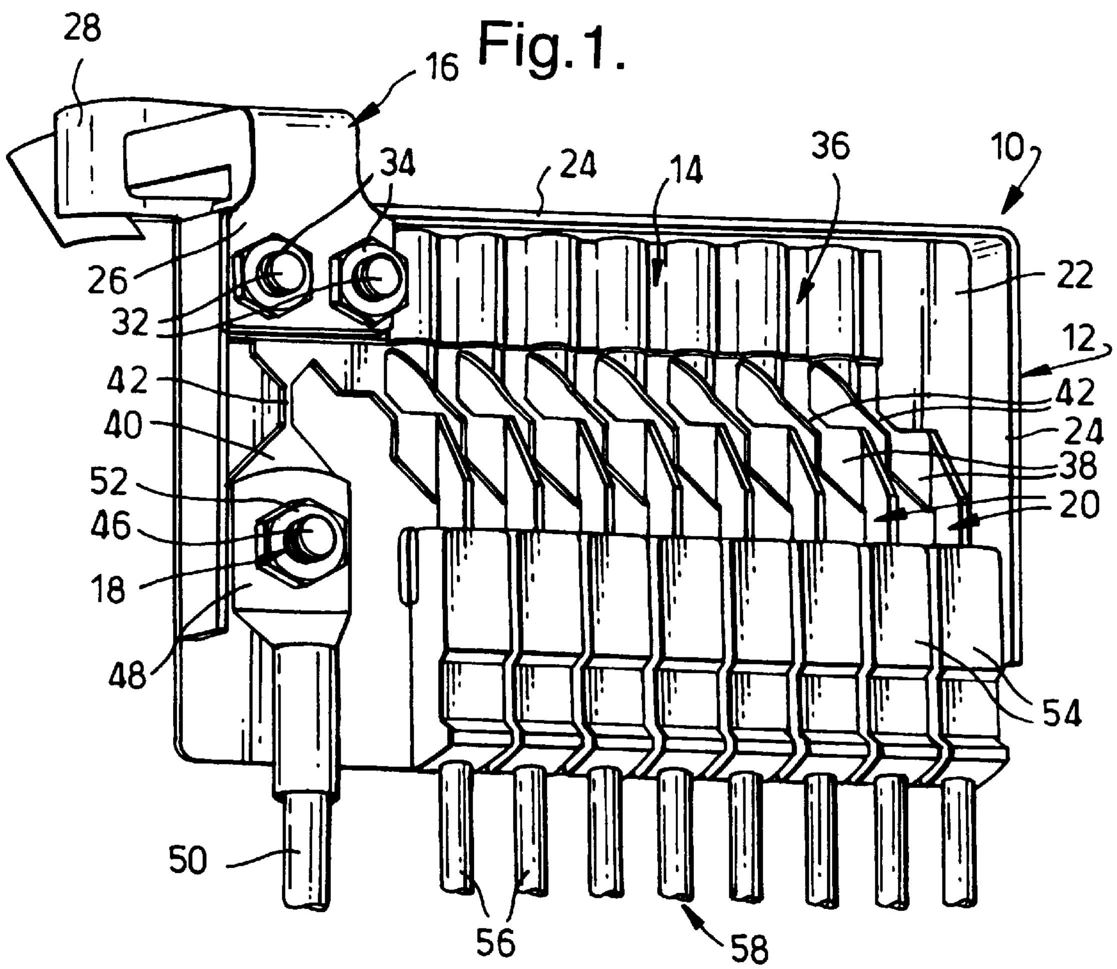
FIG. 1 is a perspective view of a fuse assembly in accordance with the present invention.
Figure 2:
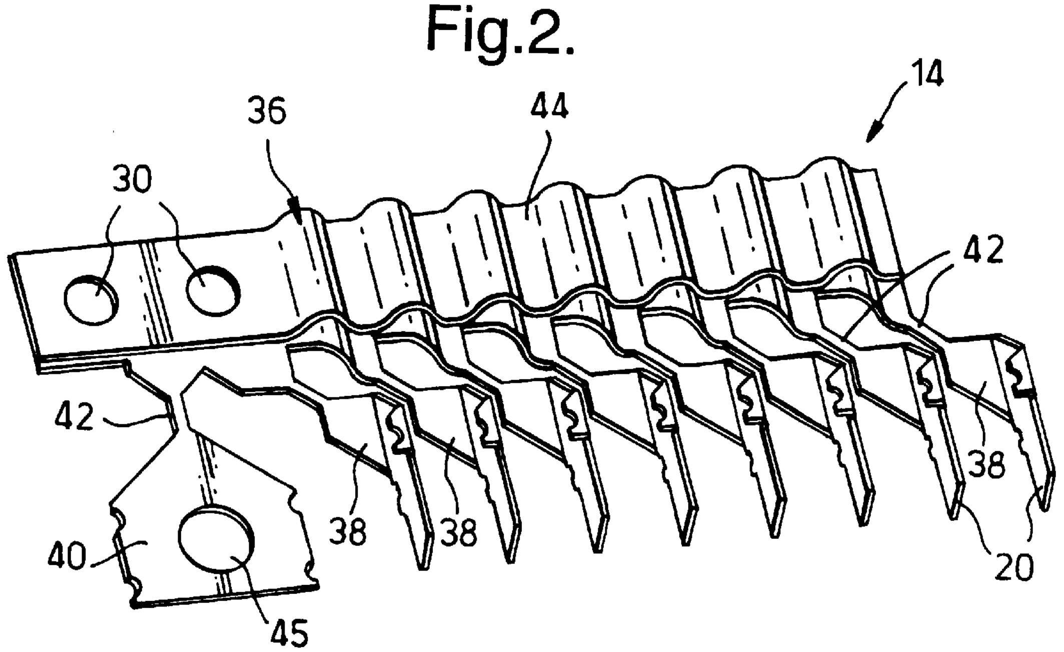
FIG. 2 is a perspective view of the fuse strip and cable harness terminals of the fuse assembly of FIG. 1.

Referring to the drawings, the fuse assembly 10 of the present invention is for mounting on a battery (not shown) of a motor vehicle. The fuse assembly 10 comprises a housing 12 of electrically insulating material, a fuse strip 14 of electrically conductive material, a battery terminal clamp 16 of electrically conductive material, a starter motor cable terminal 18, and a number of cable harness terminals 20 of electrically conductive material. The housing 12 includes a base plate 22, side walls 24, and, if required, a cover (not shown). The battery terminal clamp 16 extends through one of the side walls 24 of the housing 12, and includes a mounting portion 26 which is positioned inside the housing, and a clamp portion 28 positioned outside the housing for making an electrical connection with a terminal post (not shown) of the battery. The mounting portion 26 includes a pair of apertures. The fuse strip 14 includes a corresponding pair of apertures 30. Threaded studs 32 are secured to the base plate 22 of the housing 12 by any suitable means. The threaded studs 32 extend through the apertures in the mounting portion 26 of the battery terminal clamp 16 and the apertures 30 in the fuse strip 14. Nuts 34 are threaded on the end of the studs 32 to secure the battery terminal clamp 16 and the fuse strip 14 to the base plate 22 of the housing 12, and to make an electrical connection between the battery terminal clamp and the fuse strip.

The fuse strip 14 comprises a busbar 36, a number of contact portions 38 for the cable harness terminals 20, a contact portion 40 for the starter motor cable terminal 18, and a fusible portion 42 connecting each contact portion 38,40 with the busbar. The apertures 30 are formed in the busbar 36. The fuse strip 14 is preferably formed from sheet metal, with the busbar 36 having a double thickness compared to the contact portions 38,40 and the fusible portions 42. The busbar 36 preferably has a portion 44 which has a substantially waveform (sinusoidal) configuration. This allows the distance between the contact portions 38 to be reduced when compared to a busbar which is substantially flat. Each fusible portion 42 is capable of melting when a current above a predetermined level passes through the fusible portion. The predetermined level for melting of a fusible portion 42 is dependent on the surface area and/or cross-sectional area of that particular fusible portion. In a preferred arrangement, the fusible portion 42 connecting the busbar 36 with the contact portion 40 is set to melt when a current in excess of 300 Amperes passes therethrough, and each fusible portion connecting the busbar 36 to each contact portions 38 is set to melt at a selected current between 30 Amperes and 70 Amperes.

The contact portion 40 has an aperture 45 therethrough. The starter motor cable terminal 18 comprises a threaded stud 46 which is secured to the base plate 22 of the housing 12 in any suitable manner and which extends through the aperture 45 in the contact portion 40. In use, an apertured terminal 48 on the end of a starter motor cable 50 is placed around the stud 46 and against the contact portion 40, and a nut 52 threaded on the stud 46 to secured starter motor cable to the starter motor cable terminal 18 and to make an electrical connection between the apertured terminal 48 and the contact portion 40. The stud 46 is preferably formed from electrically conductive material.

Each contact portion 38 is secured to, and makes an electrical connection with, one of the cable harness terminals 20. In use, each cable harness terminal 20 makes an electrical connection with a corresponding terminal which is positioned inside a terminal housing 54 of electrically insulating material and which is electrically connected to a cable 56 of a cable harness 58.

The present invention provides a compact fuse assembly for a motor vehicle which ensures that all electrical cables and components on the motor vehicle are connected by way of a fusible link to the battery. The fuse assembly is easy to install in the motor vehicle; uses a single component, the fuse strip, for both power distribution and a fuse system; provides a direct connection between the fuses and the battery terminal clamp; and integrates the starter motor fuse into the assembly.

We claim:

1. A fuse assembly (10) for mounting on a battery of a motor vehicle comprising a housing (12) of electrically insulating material having a base plate (22); a starter motor cable terminal (18) mounted on the base plate; a plurality of cable harness terminals (20); a fuse strip (14) secured on the base plate and including a busbar (36), a contact portion (40) adjacent the starter motor cable terminal, contact portions (38) making an electrical connection with each cable harness terminal, and fusible links (42) connecting the contact portions with the busbar; said fuse strip (14) is formed from a single piece of sheet metal and a battery terminal clamp (16) having a mounting portion (26) positioned inside the housing and making an electrical connection with the busbar of the fuse strip, and a clamp portion (28) positioned outside the housing for making an electrical connection with a terminal post of the battery.

2. A fuse assembly as claimed in claim 1, wherein the busbar (36) has twice the thickness of the contact portions (38) and the fusible links (42).

3. A fuse assembly as claimed in claim 1, wherein a portion (44) of the busbar (36) has a waveform configuration.

4. A fuse assembly as claimed in claim 1, wherein each fusible link (42) has a predetermined surface area and/or cross-sectional area such that each fusible link is capable of melting when a current of predetermined amperage passes therethrough.

5. A fuse assembly as claimed in claim 1, wherein the starter motor cable terminal (18) comprises a threaded stud (46) which is secured to the base plate (22) of the housing (12) and which extends through an aperture (45) in the contact portion (40) adjacent the starter motor cable terminal.

6. A fuse assembly as claimed claim 1, wherein the housing (12) further comprises side walls (24) and a cover.

7. A fuse assembly as claimed in claim 1, further comprising a pair of threaded studs (32) mounted on the base plate (22) of the housing (12), the threaded studs extending through aligned apertures (30) in the mounting portion (26) of the battery terminal clamp (16) and the busbar (36) of the fuse strip (14), and having nuts (34) threaded thereon to secure the battery terminal clamp and the fuse strip in the housing.

* * * * *